US010558867B2

(12) United States Patent
Ohara et al.

(10) Patent No.: US 10,558,867 B2
(45) Date of Patent: Feb. 11, 2020

(54) IMAGE PROCESSING APPARATUS, STEREO CAMERA APPARATUS, VEHICLE, AND IMAGE PROCESSING METHOD

(71) Applicant: KYOCERA Corporation, Kyoto (JP)

(72) Inventors: Naoto Ohara, Yokohama (JP); Shushin Inoue, Yokohama (JP)

(73) Assignee: KYOCERA Corporation, Kyoto (JP)

(*) Notice: Subject to any disclaimer, the term of this patent is extended or adjusted under 35 U.S.C. 154(b) by 137 days.

(21) Appl. No.: 15/763,309

(22) PCT Filed: Sep. 27, 2016

(86) PCT No.: PCT/JP2016/004355
§ 371 (c)(1),
(2) Date: Mar. 26, 2018

(87) PCT Pub. No.: WO2017/056484
PCT Pub. Date: Apr. 6, 2017

(65) Prior Publication Data
US 2018/0285660 A1 Oct. 4, 2018

(30) Foreign Application Priority Data
Sep. 28, 2015 (JP) .................. 2015-190449

(51) Int. Cl.
*G06T 7/80* (2017.01)
*G06K 9/00* (2006.01)
(Continued)

(52) U.S. Cl.
CPC .......... *G06K 9/00798* (2013.01); *B60R 11/04* (2013.01); *G06K 9/3233* (2013.01);
(Continued)

(58) Field of Classification Search
CPC .... G06K 9/00798; G06K 9/3233; G06T 7/85; G06T 7/174; G06T 7/13; G06T 7/536;
(Continued)

(56) References Cited

U.S. PATENT DOCUMENTS 6,985,619 B1   1/2006 Seta et al.
2003/0185421 A1* 10/2003 Okamoto ........... G06K 9/00651
                                                 382/104
(Continued)

FOREIGN PATENT DOCUMENTS

JP    H04-102178 A    4/1992
JP    2003-083742 A   3/2003
(Continued)

OTHER PUBLICATIONS

Translated Version of JPH04-102178 (Year: 1992).*
International Search Report issued in PCT/JP2016/004355; dated Dec. 20, 2016.
(Continued)

*Primary Examiner* — Carol Wang
(74) *Attorney, Agent, or Firm* — Studebaker & Brackett PC

(57) ABSTRACT

An image processing apparatus includes an input interface configured to acquire images captured by a camera and a controller configured to detect an edge corresponding to at least one of two or more parallel, straight lines included in the subject of the camera from each of a plurality of frames acquired by the input interface, to select a frame for use by evaluating the detected edge, and to calculate calibration data for the camera on the basis of an approximate straight line corresponding to edge pixels obtained from a plurality of selected frames.

13 Claims, 7 Drawing Sheets

(51) Int. Cl.
*G06T 7/174* (2017.01)
*B60R 11/04* (2006.01)
*G06K 9/32* (2006.01)
*G06T 7/13* (2017.01)

(52) U.S. Cl.
CPC ............... *G06T 7/174* (2017.01); *G06T 7/85* (2017.01); *B60R 2300/107* (2013.01); *B60R 2300/402* (2013.01); *G06T 7/13* (2017.01); *G06T 2207/30256* (2013.01)

(58) Field of Classification Search
CPC . G06T 2207/30256; G06T 2207/10021; B60R 11/04; B60R 2300/107; B60R 2300/402; B60R 21/00; G01C 3/00; H04N 5/225; H04N 5/232
See application file for complete search history.

(56) References Cited

U.S. PATENT DOCUMENTS

2007/0291125 A1   12/2007  Marquet
2017/0061622 A1*   3/2017  Sakano .................... B60R 1/00

FOREIGN PATENT DOCUMENTS

JP    2008-509619 A    3/2008
JP    2011-154480 A    8/2011

OTHER PUBLICATIONS

Written Opinion issued in PCT/JP2016/004355; dated Dec. 20, 2016.

* cited by examiner $y = 0.143x^2 + 1.324x + 0.747$ $y = 0.005x^2 + 0.843x + 0.204$ $y = 0.876x^2 + 3.622x + 2.553$

IMAGE PROCESSING APPARATUS, STEREO CAMERA APPARATUS, VEHICLE, AND IMAGE PROCESSING METHOD

CROSS-REFERENCE TO RELATED APPLICATION

The present application claims priority to and the benefit of Japanese Patent Application No. 2015-190449 filed Sep. 28, 2015, the entire contents of which are incorporated herein by reference.

TECHNICAL FIELD

The present disclosure relates to an image processing apparatus, a stereo camera apparatus, a vehicle, and an image calibration method.

BACKGROUND

Some stereo camera apparatuses, in vehicles such as cars, measure the distance to a subject using a plurality of cameras.

SUMMARY

An image processing apparatus of the present disclosure includes an input interface and a controller. The input interface acquires video including a plurality of frames from a camera. The controller detects an edge corresponding to at least one of two or more parallel, straight lines in a subject of the camera from each image of the plurality of frames acquired by the input interface. The controller selects a frame for use by evaluating the detected edge. The controller calculates calibration data for the video acquired from the camera on the basis of an approximate straight line corresponding to the edge obtained from a plurality of selected frames.

A stereo camera apparatus of the present disclosure includes a stereo camera and an image processing apparatus. The image processing apparatus includes an input interface and a controller. The input interface acquires video including a plurality of frames from the stereo camera. The controller detects an edge corresponding to at least one of two or more parallel, straight lines in a subject of the camera from each image of the plurality of frames acquired by the input interface. The controller selects a frame for use by evaluating the detected edge. The controller calculates calibration data for the video acquired from the camera on the basis of an approximate straight line corresponding to the edge obtained from a plurality of selected frames.

A vehicle of the present disclosure includes a stereo camera and an image processing apparatus. The image processing apparatus includes an input interface and a controller. The input interface acquires video including a plurality of frames from the stereo camera. The controller detects an edge corresponding to at least one of two or more parallel, straight lines in a subject of the camera from each image of the plurality of frames acquired by the input interface. The controller selects a frame for use by evaluating the detected edge. The controller calculates calibration data for the video acquired from the camera on the basis of an approximate straight line corresponding to the edge obtained from a plurality of selected frames.

An image processing method of the present disclosure includes acquiring, with an input interface, video including a plurality of frames from the camera. The image processing method includes detecting, with a controller, an edge corresponding to at least one of two or more parallel, straight lines in a subject of the camera from each image of the plurality of frames acquired by the input interface. The image processing method includes selecting, with the controller, a frame for use by evaluating the detected edge. The image processing method includes calculating, with the controller, calibration data for the video acquired from the camera on the basis of an approximate straight line corresponding to the edge obtained from a plurality of selected frames.

BRIEF DESCRIPTION OF THE DRAWINGS

In the accompanying drawings:

FIG. 4A illustrates an example of a binary image in which the number of detected edges is greater than or equal to a predetermined threshold, and FIG. 4B illustrates an example of a binary image in which the number of detected edges is less than a predetermined threshold;

FIG. 5A illustrates edge sets detected from an image capturing a sloping road having two lane markings, FIG. 5B illustrates edge sets detected from an image capturing a flat road having two parallel lane markings, and FIG. 5C illustrates edge sets detected from an image capturing a curve having two lane markings;

DETAILED DESCRIPTION

In order to calculate the distance to an object accurately, the relative positions of two cameras that constitute a stereo camera are assumed to be aligned. However, the relative positions of the two cameras may become misaligned due to inaccurate attachment of the stereo camera, external vibration or shock after attaching the stereo camera, and a change in position over time.

To address this issue, a known method calibrates a misalignment between images due to a misaligned position of the stereo camera on the basis of lane markings, such as white lines, imaged in a benchmark image and a reference image. A point in 3D coordinate space corresponding to the vanishing point, which is the intersection of the extensions of two white lines on the road surface imaged in both the benchmark image and the reference image, is at infinity from the stereo camera in 3D coordinate space. In other words, when two cameras are attached at accurate positions, the parallax, d, between the vanishing point in the benchmark image and the vanishing point in the reference image is zero. Conventional distance adjustment apparatuses therefore calculate the intersection (vanishing point) of vanishing lines that are extensions of two straight lines in each of a right image (benchmark image) and a left image (reference image) and set a calibration error so that the parallax, d, between the intersections becomes zero.

In the method of the above-described known technique, the vanishing point calculated from the lane markings, such as imaged white lines, may not be accurate if images in a plurality of frames include an image in which the lane markings are not detected accurately due to the lane markings being partially absent. Such inaccurate vanishing points may prevent accurate calibration of the images. Furthermore, if the images in a plurality of frames include an image in which two lane markings are not straight lines, the vanishing points calculated on the basis of the lane markings are not at infinity. Such vanishing points may prevent accurate calibration of the images even when the parallax, d, of the vanishing points is set to zero.

According to the present disclosure, images can be calibrated more accurately.

An embodiment of the present disclosure is described below with reference to the drawings.

Figure 1:
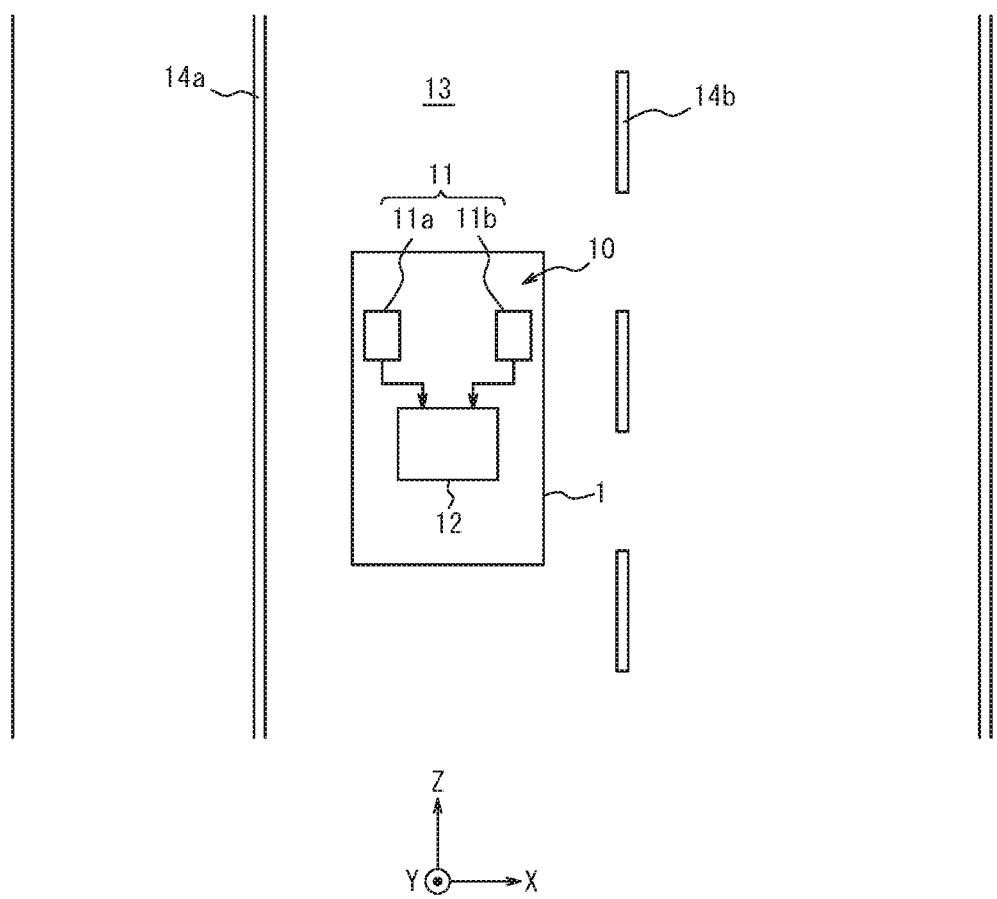
FIG. 1 is a simplified view of a vehicle that is equipped with a stereo camera apparatus and is traveling on a road.

In the 3D coordinate space illustrated in FIG. 1, the direction of travel of a vehicle 1 (upward in FIG. 1) is referred to as the Z-direction, the vehicle width direction of the vehicle 1 (to the right in FIG. 1) is referred to as the X-direction, and the height direction that is the direction orthogonal to the X-direction and the Z-direction (the direction orthogonal to the page) is referred to as the Y-direction. Here, the term "vehicle" in the present disclosure includes, but is not limited to, automobiles, railway vehicles, industrial vehicles, and vehicles for daily life. For example, the term "vehicle" may include airplanes that travel down a runway. Automobiles include, but are not limited to, passenger vehicles, trucks, buses, motorcycles, and trolley buses, and may include other vehicles that travel on the road. Railway vehicles include, but are not limited to, locomotives, freight cars, passenger cars, streetcars, guided railway vehicles, ropeways, cable cars, linear motor cars, and monorails, and may include other vehicles that travel along a track. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. Vehicles for daily life include, but are not limited to, bicycles, wheelchairs, baby carriages, wheelbarrows, and motorized, two-wheeled standing vehicles. Power systems for the vehicle include, but are not limited to, internal-combustion engines including diesel engines, gasoline engines, and hydrogen engines, and electrical engines including motors. The term "vehicle" includes man-powered vehicles. The vehicle is not limited to the above-listed types. For example, automobiles may include industrial vehicles that can drive on the road, and the same vehicle may be included in multiple categories.

The stereo camera apparatus 10 includes a stereo camera 11 and an image processing apparatus 12 connected electrically to the stereo camera 11. The stereo camera 11 is configured to include two cameras, a first camera 11a and a second camera 11b. A "stereo camera" refers to a plurality of cameras that have mutual parallax and that cooperate. The stereo camera includes at least two cameras. The stereo camera can cause the plurality of cameras to cooperate to image an object from a plurality of directions. Apparatuses that can cause a plurality of cameras to work together to image a subject simultaneously are encompassed by the term "stereo camera". "Simultaneous" imaging is not limited to the exact same time. For example, the "simultaneous" imaging as used in the present disclosure includes (i) the plurality of cameras capturing images at the same time, (ii) the plurality of cameras capturing images in response to the same signal, and (iii) the plurality of cameras capturing images at the same time according to respective internal clocks. The time at which imaging starts, the time at which imaging ends, the time at which captured image data is transmitted, and the time at which another device receives image data are examples of reference times at which imaging may be considered to occur. The stereo camera may be a device that includes a plurality of cameras in a single housing. The stereo camera may also be a device that includes two or more independent cameras positioned apart from each other. The stereo camera is not limited to a plurality of independent cameras. In the present disclosure, a camera having an optical mechanism that guides light incident at two separate locations to one optical detector, for example, may be adopted as the stereo camera. The two independent cameras, i.e. the first camera 11a and the second camera 11b, are arranged side-by-side in the stereo camera apparatus 10. In the present disclosure, a plurality of images of the same subject captured from different viewpoints is also referred to as a "stereo image".

The first camera 11a and the second camera 11b each include a solid-state image sensor. The solid state image sensor includes a charge-coupled device (CCD) image sensor or a complementary MOS (CMOS) image sensor. The first camera 11a and the second camera 11b may include a lens mechanism.

The optical axes of the first camera 11a and the second camera 11b are oriented in directions in which the same target can be imaged. The optical axes of the first camera 11a and the second camera 11b differ from each other. The optical axes and the positions of the first camera 11a and the second camera 11b are determined so as to include at least the same target in the captured images. The optical axes of the first camera 11a and the second camera 11b are oriented to be parallel to each other. The term "parallel" here is not limited to strict parallelism and encompasses a tolerance accounting for misalignment upon assembly, misalignment upon attachment, and misalignment over time. The optical axes of the first camera 11a and the second camera 11b are not limited to being parallel to each other and may be oriented in different directions.

The first camera 11a and the second camera 11b are fixed to the body of the vehicle 1 to reduce variation in the position and the orientation relative to the vehicle 1. Even when fixed in place, the first camera 11a and the second camera 11b may change in position or orientation relative to the vehicle 1. The optical axes of the first camera 11a and the second camera 11b may be oriented towards the front (Z-direction) of the vehicle 1.

While the vehicle 1 is traveling, the stereo camera apparatus 10 can image various subjects, including vehicles in front, obstacles, and lane markings 14a to 14d drawn on the road surface 13, such as road boundary lines and the center line. The optical axes of the first camera 11a and the second camera 11b may be inclined from the Z-direction towards the road surface 13. The optical axes of the first camera 11a and the second camera 11b may be oriented in the Z-direction or may be inclined towards the sky from the Z-direction. The optical axes of the first camera 11a and the second camera 11b are modified appropriately for the intended use.

The first camera 11a and the second camera 11b are positioned apart from each other in a direction that crosses the optical axes. In an embodiment, the first camera 11a and the second camera 11b are positioned along the vehicle width direction (X-direction) of the vehicle 1. The first camera 11a is positioned on the left side of the second camera 11b when facing forward, and the second camera 11a is positioned on the right side of the first camera 11a when facing forward. Due to the difference in positions of the first camera 11a and the second camera 11b, a corresponding subject appears at different positions in two images captured by the cameras 11a, 11b. The image output from the first camera 11a and the image output from the second camera 11b are a stereo image captured from different viewpoints. The first camera 11a and the second camera 11b are arranged side by side at a distance from each other in the vehicle width direction (X direction). The distance connecting the optical centers of the first camera 11a and the second camera 11b is referred to as the "baseline length", and the direction thereof as the "baseline length direction". Accordingly, the baseline length direction in the present embodiment is the X-direction.

In an embodiment, the optical axes of the first camera 11a and the second camera 11b are oriented in the direction ahead of the vehicle 1 (the Z-direction) and are fixed at the front of the vehicle 1. In an embodiment, the first camera 11a and the second camera 11b can image the outside of the vehicle 1 through the windshield of the vehicle 1. In an embodiment, the first camera 11a and the second camera 11b may be fixed to one of the front bumper, the fender grills, the side fenders, the light modules, and the hood (bonnet) of the vehicle 1. The positions of the first camera 11a and the second camera 11b are not limited to these examples. In an embodiment, the first camera 11a and the second camera 11b may be positioned vertically (in the Y-direction) or diagonally within the XY-plane. In these cases, the images output from the first camera 11a and the second camera 11b constitute stereo images having vertical or diagonal parallax.

In the image space of the image output by the first camera 11a and the image output by the second camera 11b, the direction in which the X-direction of the 3D coordinate space is projected is referred to below as the x-direction and the direction in which the Y-direction of the 3D coordinate space is projected is referred to below as the y-direction.

In the present embodiment, the image output by the first camera 11a is referred to as a benchmark image, and the image output by the second camera 11b is referred to as a reference image. The stereo camera apparatus 10 calculates the parallax of the reference image relative to the benchmark image. Cameras with the same specifications may be used as the first camera 11a and the second camera 11b. Cameras with different specifications may also be used as the first camera 11a and the second camera 11b. The benchmark image may be captured by the second camera 11b, and the reference image may be captured by the first camera 11a.

The first camera 11a and the second camera 11b output the respective captured images as digital data to the image processing apparatus 12 provided within the vehicle 1. The image processing apparatus 12 can perform various processing on each of the benchmark image output by the first camera 11a and the reference image output by the second camera 11b. The image processing apparatus 12 may transmit and receive information to and from other information processing apparatuses in the vehicle 1 over a network, such as a controller area network (CAN).

Figure 2:
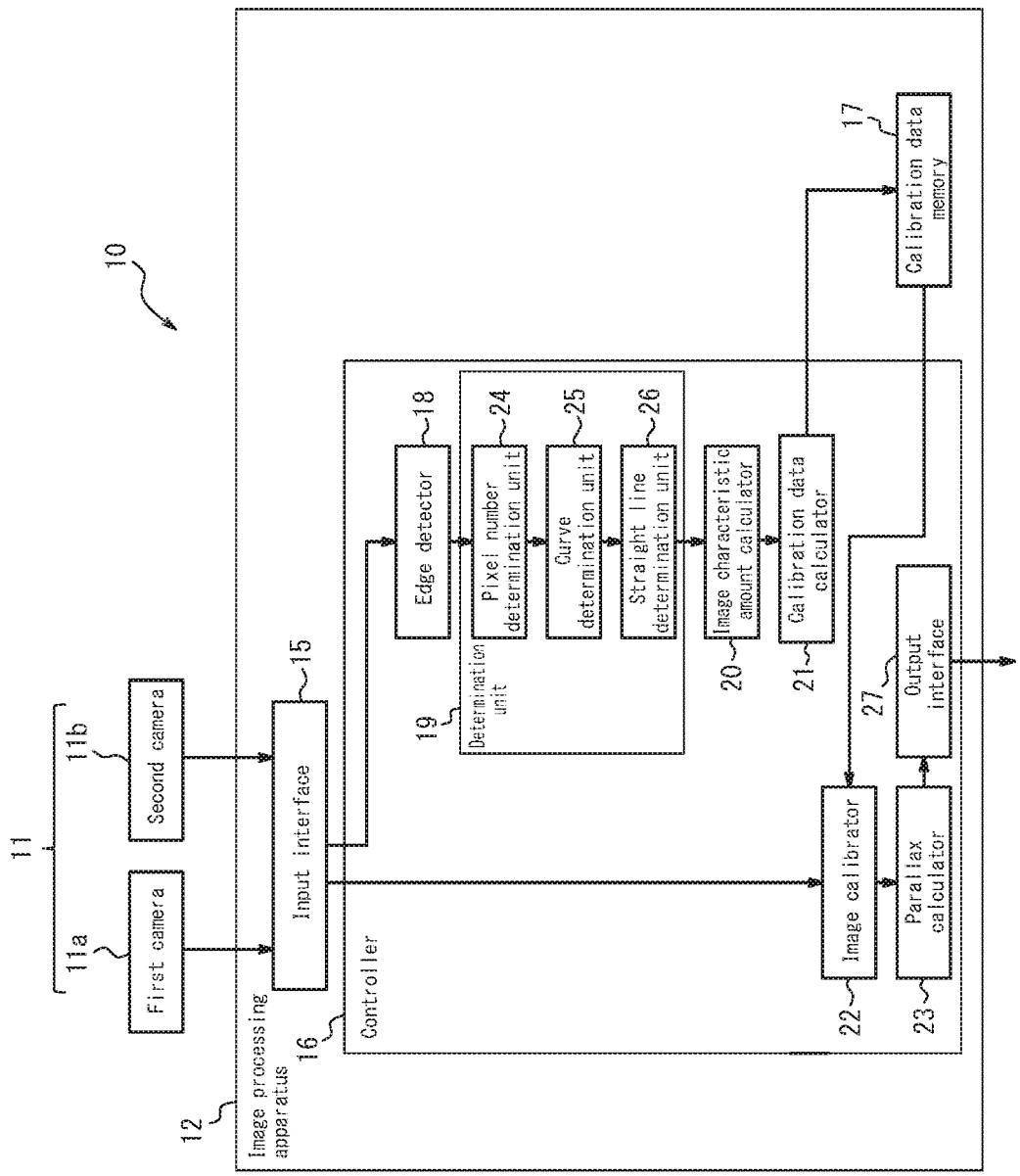
FIG. 2 is a block diagram illustrating the configuration of a stereo camera apparatus according to an embodiment.

FIG. 2 is a block diagram illustrating the configuration of the stereo camera apparatus 10 according to the present embodiment. As described above, the stereo camera apparatus 10 includes the stereo camera 11 and the image processing apparatus 12. The image processing apparatus 12 is configured to include an input interface 15, a controller 16, and a calibration data memory 17.

The input interface 15 is an input interface for inputting image data to the image processing apparatus 12. A physical connector or a wireless communication device can be used in the input interface 15. Physical connectors include an electrical connector supporting transmission by an electric signal, an optical connector supporting transmission by an optical signal, and an electromagnetic connector supporting transmission by an electromagnetic wave. Electrical connectors include connectors conforming to IEC60603, connectors conforming to the USB standard, and connectors comprising RCA terminals. Electrical connectors also include connectors comprising S terminals prescribed by EIAJ CP-1211A and connectors comprising D terminals prescribed by EIAJ RC-5237. Electrical connectors also include connectors conforming to the HDMI® (HDMI is a registered trademark in Japan, other countries, or both) standard and connectors comprising a coaxial cable that includes a BNC connector. Optical connectors include a variety of connectors conforming to IEC 61754. Wireless communication devices include wireless communication devices conforming to standards that include Bluetooth® (Bluetooth is a registered trademark in Japan, other countries, or both) and IEEE802.11. The wireless communication device includes at least one antenna.

Figure 3:
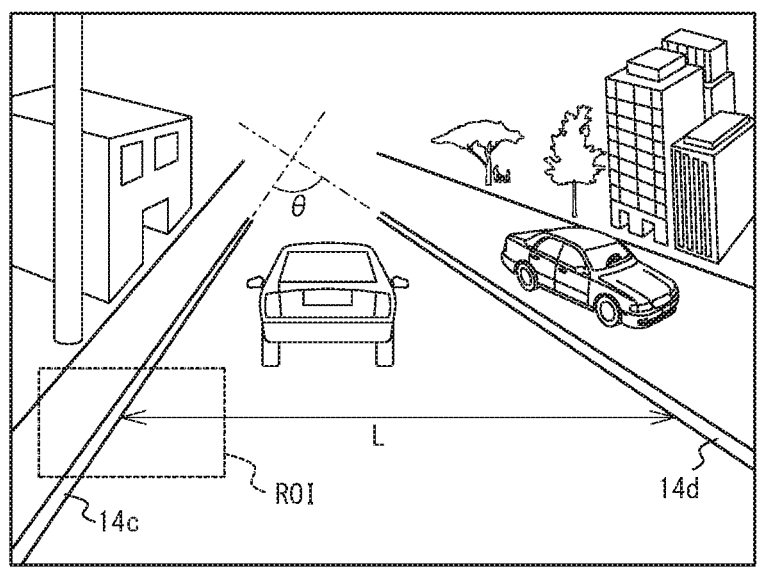
FIG. 3 illustrates an example of an image acquired by an input interface.

The input interface 15 receives input from the first camera 11a and the second camera 11b of image data of a benchmark image and a reference image such as the ones illustrated in FIG. 3 (either the benchmark image or the reference image being referred to below simply by the term "image"). The input interface 15 delivers the input image data to the controller 16. Input to the input interface 15 includes signal input over a wired cable and signal input over a wireless connection. The input interface 15 may correspond to the transmission method of an image signal in the stereo camera 11.

The controller 16 is a component that executes various calculation processes in respect of the image processing apparatus 12. The controller 16 includes one or more processors. The controller 16 or the processor may include one or more memories that store programs for various processing and store information during calculations. The term "memory" encompasses volatile memory and non-volatile memory. The memory may be configured as a memory independent from the processor and/or a memory embedded in the processor. The term "processor" encompasses universal processors that execute particular functions by reading particular programs and dedicated processors that are specialized for particular processing. Dedicated processors include application specific integrated circuits (ASICs) for a specific application. Processors include programmable logic devices (PLDs). PLDs include field-programmable gate arrays (FPGAs). The controller 16 may be either a system-on-a-chip (SoC) or a system in a package (SiP) with one processor or a plurality of processors that work together.

The calibration data memory 17 includes a rewritable memory for storing calibration data calculated by a calibration data calculator 21. The calibration data memory 17 can, for example, be a flash memory or a magnetoresistive random access memory (MRAM). The calibration data memory 17 can also, for example, be a non-volatile memory such as a ferroelectric random access memory (FeRAM) or the like.

The constituent elements of the controller 16 in an embodiment are now described. In an embodiment, the controller 16 encompasses an edge detector 18, a determination unit 19, an image characteristic amount calculator 20, a calibration data calculator 21, an image calibrator 22, and a parallax calculator 23. Each of these functional blocks may be a hardware module or a software module. The controller 16 can execute the operations that can be performed by each functional block. The controller 16 may execute all of the operations of each functional block. The operations performed by each functional block may be synonymous with operations performed by the controller 16. The controller 16 itself may execute the processing that the controller 16 causes any of the functional blocks to perform.

The edge detector 18 detects at least one edge from the images acquired by the input interface 15. For example, when the difference in the pixel value between a certain pixel and a nearby pixel is at least a predetermined value, the edge detector 18 detects the certain pixel, or the distance between the certain pixel and the nearby pixel, as an edge. The edge detector 18 detects an edge from a region of interest (ROI) in an image. Here, the region of interest is a region, within images output by the plurality of cameras in the stereo camera apparatus 10 attached to the vehicle 1, in which two or more parallel, straight lines included in the subject of the cameras are empirically expected to appear. The region of interest is set in advance. The lane marking 14c, indicated within the dotted lines, and the lane marking 14d in FIG. 3 are an example of the two or more parallel, straight lines included in the subject of the cameras. The term "parallel" describing the two or more straight lines is not limited to strict parallelism and allows for misalignment within a predetermined range.

In the image in which the lane markings 14c, 14d on the road are captured, the pixels corresponding to the lane markings 14c, 14d in the image and the pixels corresponding to the road near the lane markings 14c, 14d have a difference in pixel value of at least a predetermined value. The pixels corresponding to the edge of the lane markings 14c, 14d are detected by the edge detector 18 as edges. The controller 16 can identify the portion corresponding to the lane markings 14c, 14d by detecting edges in the image.

Figure 4A:
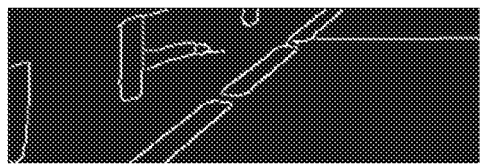
FIGS. 4A and 4B illustrate examples of binary images converted by the edge detector illustrated in FIG. 2, where
Figure 4B:

The edge detector 18 converts the image acquired by the input interface 15 into a grayscale image. Using the Canny algorithm or the like, the edge detector 18 may emphasize the edges within the region of interest in the grayscale image for conversion to an inverted binary image, such as those illustrated in FIGS. 4A and 4B. The images illustrated in FIGS. 4A and 4B are inverted binary images, but these may be binary images instead. The edge detector 18 identifies the positional coordinates representing the positions in the image space of each detected edge.

The determination unit 19 evaluates whether the edges detected by the edge detector 18 can be used as calibration data. According to this evaluation, frames to be used as calibration data are selected from among images of a plurality of frames captured by the stereo camera 11. The determination unit 19 is configured to encompass functional blocks such as a pixel number determination unit 24, a curve determination unit 25, and a straight line determination unit 26.

Apart from a processor for overall control, the controller 16 may include one or more dedicated processors for the determination unit 19. The one or more dedicated processors for the determination unit 19 may include an ASIC. The determination unit 19 may perform the determination process for a plurality of frames in parallel.

The constituent elements of the determination unit 19 are now described.

The pixel number determination unit 24 calculates the number of edge pixels detected by the edge detector 18 and determines whether the calculated number of edge pixels is greater than or equal to a predetermined threshold. The pixel number determination unit 24 determines, for example, that the number of edge pixels in the binary image illustrated as an example in FIG. 4A is greater than or equal to a predetermined threshold. The pixel number determination unit 24 determines, for example, that the number of edge pixels in the binary image illustrated as an example in FIG. 4B is less than a predetermined threshold. The predetermined threshold is used to determine that a set of edge pixels constitutes a line once the number of edge pixels in the set exceeds the predetermined threshold. When, for example, the edges in the binary image are thin lines only one pixel wide, the predetermined threshold is, for example, 40% of the vertical number of pixels in the region of interest. The predetermined threshold is not limited to 40% of the vertical number of pixels and can be set to another value.

An image for which the pixel number determination unit 24 determines that the number of edge pixels is greater than or equal to the predetermined threshold becomes a target for processing by the below-described curve determination unit 25.

When the number of edge pixels detected by the edge detector 18 is greater than or equal to the predetermined threshold, the curve determination unit 25 calculates an approximate curve of the edge on the basis of the position, in the image space, of the detected edge. Specifically, the curve determination unit 25 calculates the quadratic coefficient, a, of the quadratic function in equation (1), which represents an approximate curve in image space represented in the x-direction and y-direction, by fitting each coordinate of the edge to equation (1).

$$y = ax^2 + bx + c \tag{1}$$

The curve determination unit 25 determines whether the absolute value of the calculated quadratic coefficient, a, is less than a predetermined threshold. Here, the predetermined threshold is a value, set in advance, such that the approximate line formed by the edge set can be considered a straight line when the quadratic coefficient is less than this value.

Figure 5A:
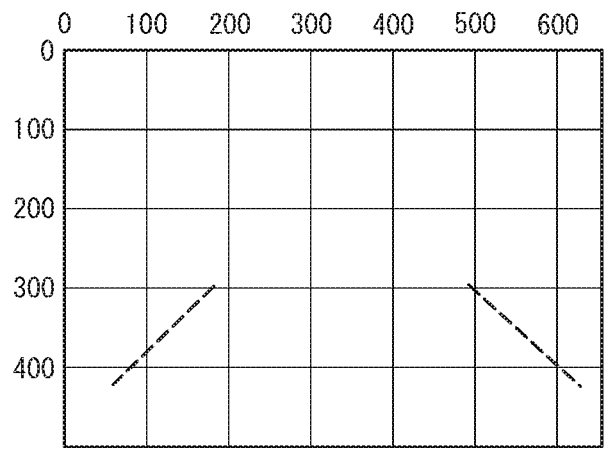
FIGS. 5A, 5B, and 5C illustrate edge sets within the region of interest calculated by the edge detector illustrated in FIG. 2, where
Figure 5B:
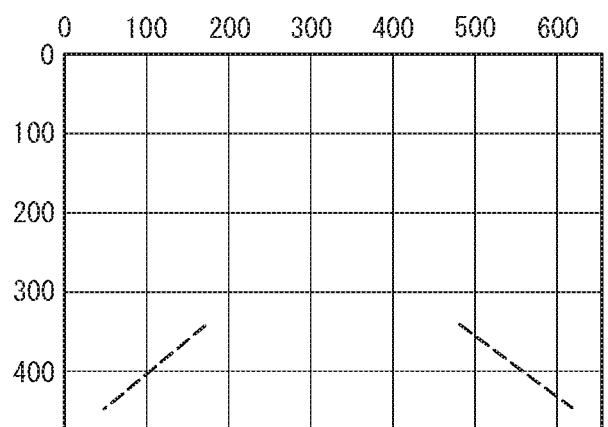
Figure 5C:
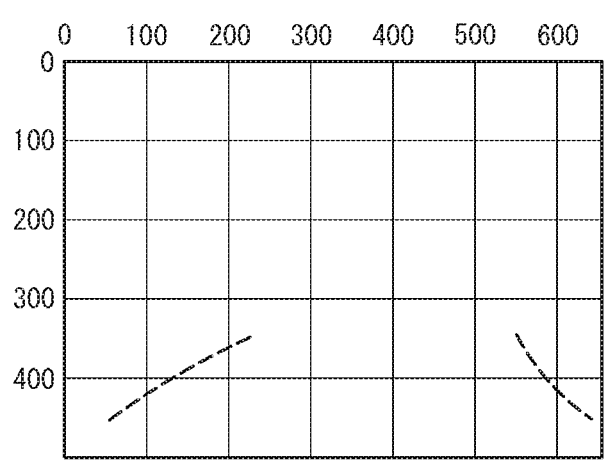

With reference to FIGS. 5A, 5B, and 5C, examples of calculation by the curve determination unit 25 are described. FIG. 5A illustrates edge sets detected from an image capturing a sloping road (grade R=100 m) having two lane markings. FIG. 5B illustrates edge sets detected from an image capturing a flat road having two parallel lane markings. FIG. 5C illustrates edge sets detected from an image capturing a curved road (right curve R=40 m) having two lane markings. The coordinates in FIGS. 5A to 5C are in units of pixels, with the upper left corner as the origin, the horizontal axis as the x-axis, and the vertical axis as the y-axis. Of the two detected edge sets, the quadratic function below each figure was calculated by fitting the right edge set. The predetermined threshold for the absolute value of the coefficient, a, is 0.010, for example, in the image capturing the sloping road that has the two lane markings 14a, 14b. In the example illustrated in FIG. 5A, the absolute value of the quadratic coefficient, a, of the quadratic function obtained by fitting the edge coordinates is 0.143 in an image capturing a sloping road that has two parallel lane markings. The curve determination unit 25 determines in this case that the coefficient, a, is greater than or equal to the predetermined threshold. In the example illustrated in FIG. 5B, the absolute value of the quadratic coefficient, a, is 0.005 in an image capturing a flat road having two parallel lane markings. The curve determination unit 25 determines in this case that the quadratic coefficient, a, is less than the predetermined threshold. In the example illustrated in FIG. 5C, the absolute value of the quadratic coefficient, a, is 0.876 in an image capturing a curved road having two parallel lane markings. The curve determination unit 25 determines in this case that the coefficient, a, is greater than or equal to the predetermined threshold.

An image for which the curve determination unit 25 determines that the absolute value of the quadratic coefficient, a, is less than the predetermined threshold becomes the target for processing by the below-described straight line determination unit 26.

The straight line determination unit 26 calculates the mean square error of an approximate straight line on the basis of the position coordinates, in the image space, of the edge detected by the edge detector 18 for an image in which the curve determination unit 25 determines that the absolute value of the quadratic coefficient, a, of the approximate curve is less than a predetermined threshold. Specifically, the straight line determination unit 26 calculates the linear coefficient, d, and the constant, e, in the linear function indicated in equation (2), which represents an approximate straight line, by fitting each coordinate of the edge detected by the edge detector 18 to equation (2).

$$y=dx+e \qquad (2)$$

The straight line determination unit 26 calculates the mean square error of each coordinate of the edge with respect to the linear function that represents the calculated approximate straight line. The straight line determination unit 26 then determines whether the calculated mean square error is less than a predetermined threshold.

An image for which the straight line determination unit 26 determines that the mean square error is less than the predetermined threshold is evaluated as being usable for calculation of calibration data.

When the approximate straight line for the edge is determined to be a straight line, the image characteristic amount calculator 20 calculates an image characteristic amount on the basis of information, representing the approximate line, output by the determination unit 19. The image characteristic amount is the value of a characteristic characterizing an image, such as the position coordinate, in the image space, of the vanishing point that is the intersection of the two lane markings captured in an image, as in the example in FIG. 3. The image characteristic amount may, for example, be the lane marking intersection angle θ between the two lane markings. The image characteristic amount may be the lane marking distance L, which is the distance between the two lane markings at a predetermined y-coordinate, or the like.

The calibration data calculator 21 calculates calibration data, for calibrating the reference image relative to the benchmark image, on the basis of a statistical value of a plurality of image characteristic amounts calculated by the image characteristic amount calculator 20 and stores the calibration data in the calibration data memory 17. The calibration data is used for calibration by the image calibrator 22 described below.

Figure 6:
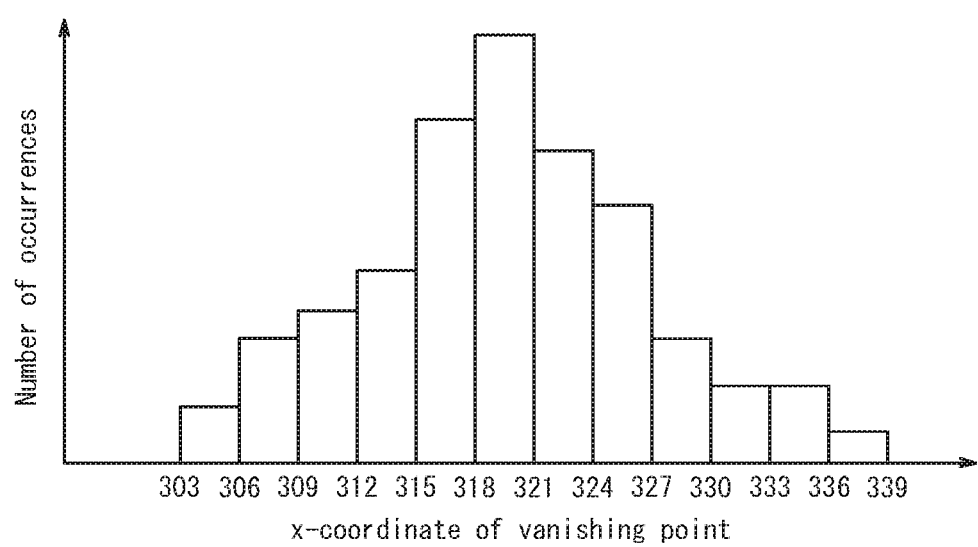
FIG. 6 illustrates an example of a histogram of image characteristic amounts.

The statistical value is yielded by statistically processing a plurality of image characteristic amounts. The statistical value may be calculated by any statistical process and is, for example, the mode, median, or mean of the image characteristic amounts. For example, the calibration data calculator 21 generates a histogram of a plurality of image characteristic amounts and calculates the calibration data on the basis of the mode of the histogram. The histogram of the image characteristic amounts may represent the image characteristic amounts themselves on the horizontal axis and the number of occurrences of each image characteristic amount on the vertical axis. The histogram of the image characteristic amounts may, as illustrated in FIG. 6, represent predetermined ranges of image characteristic amounts on the horizontal axis and the number of occurrences of image characteristic amounts (the x-coordinate of the vanishing point in the example in FIG. 6) in each range.

Specifically, the calibration data calculator 21 generates a histogram of the position coordinates of the vanishing point at the intersection of the two approximate straight lines, as calculated by the image characteristic amount calculator 20 from the benchmark images of a plurality of frames, and calculates the statistical value thereof as the position coordinates of a first vanishing point. Here, the number of frames serving as the basis of the statistical value can, for example, be 10,000 frames. When calculating calibration data, the calibration data calculator 21 sets the statistical value of the x-coordinate and the y-coordinate of each vanishing point to the position coordinates of the first vanishing point. The calibration data calculator 21 also calculates the statistical value of the position coordinates of the vanishing point at the intersection of the two approximate straight lines, output by the image characteristic amount calculator 20 from the reference images of a plurality of frames, as the position coordinates of a second vanishing point with the same method as for the first vanishing point.

The calibration data calculator 21 uses the statistical value of the vanishing point in each frame as the first vanishing point, as described above. The calibration data calculator 21 may, for example, calculate two approximate straight lines from edges of the lane markings 14c and 14d determined to be useable in different frames and designate the intersection thereof as the first vanishing point. The calibration data calculator 21 may, for example, calculate two approximate straight lines from edges of the lane markings 14c and 14d determined to be useable in different frames and designate the intersection thereof as the second vanishing point. By calculating at least one of the first vanishing point and the second vanishing point from different frames, the calibration data calculator 21 can use frames for which the edge of only one of the lane markings 14c and 14d is determined to be useable.

The calibration data calculator 21 calculates calibration data for calibrating the reference image relative to the benchmark image so that the position coordinates of the first vanishing point and the position coordinates of the second vanishing point match.

The calibration data calculator 21 may calculate a statistical value of the lane marking intersection angle θ of two approximate straight lines, output by the image characteristic amount calculator 20 from the benchmark images of a plurality of frames, as a first lane marking intersection angle θ1. In this case, the calibration data calculator 21 calculates a statistical value of the lane marking intersection angle θ of two approximate straight lines, output by the image characteristic amount calculator 20 from the reference images of a plurality of frames, as a second lane marking intersection angle θ2. The calibration data calculator 21 then calculates calibration data for calibrating the angle of view of the reference image relative to the benchmark image so that the first lane marking intersection angle θ1 and the second lane marking intersection angle θ2 match.

The calibration data calculator 21 may calculate a statistical value of the lane marking distance L of two approximate straight lines, output by the image characteristic amount calculator 20 from the benchmark images of a plurality of frames, as a first lane marking distance L1. In this case, the calibration data calculator 21 calculates a statistical value of the lane marking distance L of two approximate straight lines, output by the image characteristic amount calculator 20 from the reference images of a plurality of frames, as a second lane marking distance L2. The calibration data calculator 21 then calculates calibration data for calibrating the angle of view of the reference image relative to the benchmark image so that the first lane marking distance L1 and the second lane marking distance L2 match.

The image calibrator 22 calibrates the reference image relative to the benchmark image on the basis of calibration data calculated by the calibration data calculator 21 and accumulated in the calibration data memory 17. This calibration refers to electronic calibration, by image conversion within the image calibrator 22, to correct a misalignment occurring over time, or due to external vibration, shock, or the like, between the first camera and the second camera. With this calibration, the image calibrator 22 places the reference image and the benchmark image in a state of being parallel and at the same level.

The parallax calculator 23 uses the benchmark image and the reference image calibrated by the image calibrator 22. The parallax calculator 23 divides the reference image into a plurality of regions. The parallax calculator 23 matches each of the divided regions with the benchmark image. On the basis of the difference in horizontal coordinates of two regions matched between the benchmark image and the reference image, the parallax calculator 23 calculates the distance of the two regions.

Specifically, the parallax calculator 23 designates two captured images respectively as the benchmark image and the reference image and partitions the reference image vertically and horizontally into blocks (small regions). The parallax calculator 23 performs matching while shifting a block of the partitioned reference image consecutively at equal pitch (for example, one pixel at a time) in the baseline length direction (the direction connecting the optical centers of the two cameras in the stereo camera) relative to the benchmark image. Matching is performed by comparing the luminance or color pattern of the pixels in the block of the reference image with the corresponding pixels in the benchmark image. For example, in the case of comparing the luminance, the parallax calculator 23 searches for the shift amount at which the absolute value of the difference in luminance between corresponding pixels is minimized and determines that the shift amount at this time is the parallax. The parallax calculator 23 can execute this matching process with a dedicated hardware circuit. Using the principle of triangulation, the parallax calculator 23 can use equation (3) to calculate the distance, Z, to an object of detection imaged in a block, where d is the parallax obtained in the above way, b is the baseline length of the two cameras, and f is the focal length of the cameras.

$$Z = b \cdot f / d \quad (3)$$

By detecting a portion where regions with equivalent distance are grouped together, the parallax calculator 23 identifies an object present at the corresponding position. The parallax calculator 23 identifies the distance to the identified object on the basis of the distance to the region in which the object was identified. Obstacles are included among the objects identified by the parallax calculator 23. Obstacles include at least one of humans, vehicles, road signs, buildings, and plants. In an embodiment, the parallax calculator 23 associates the identified object with a distance image. The parallax calculator 23 outputs information including at least one of the distance image, the identified object, and the distance to the object through an output interface 27. In an embodiment, the parallax calculator 23 executes processing in real-time.

As necessary, the distance obtained by the parallax calculator 23 is used along with distance information obtained from a sensor, such as a laser radar, millimeter wave radar, or the like for warning the driver in order to avoid a collision. As necessary, the distance obtained by the parallax calculator 23 is also used for driver assistance, including control of the accelerator or brakes for cruise control.

To perform one-dimensional matching between the benchmark image and the reference image at high speed, the parallax calculator 23 may include a dedicated parallel processing circuit for stereo image processing as a parallax calculation circuit.

An image processing method of the image processing apparatus 12 is described below with reference to the flowcharts in FIG. 7 and FIG. 8.

Figure 7:
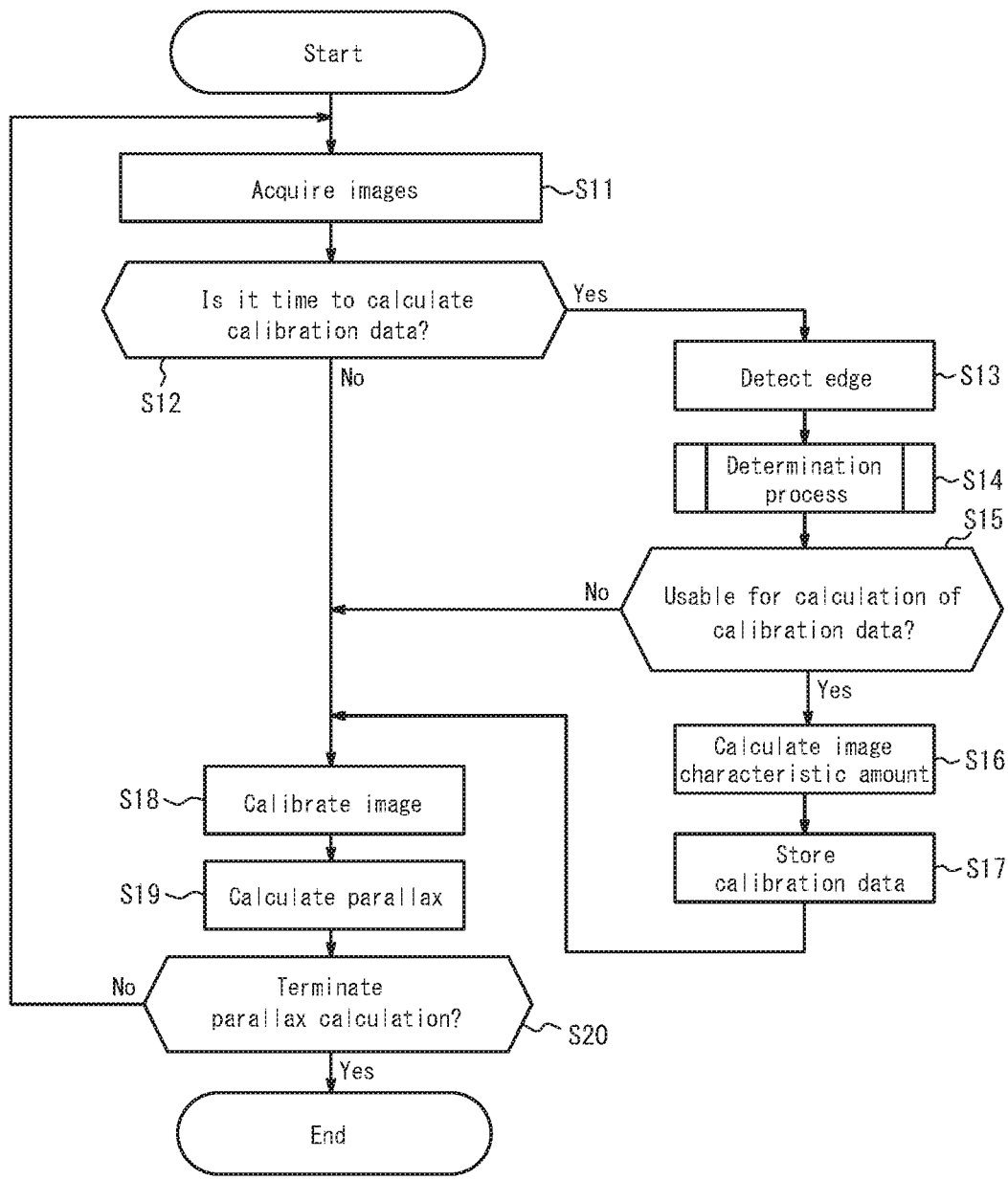
FIG. 7 is a flowchart illustrating a procedure for image calibration performed by an image processing apparatus.
Figure 8:
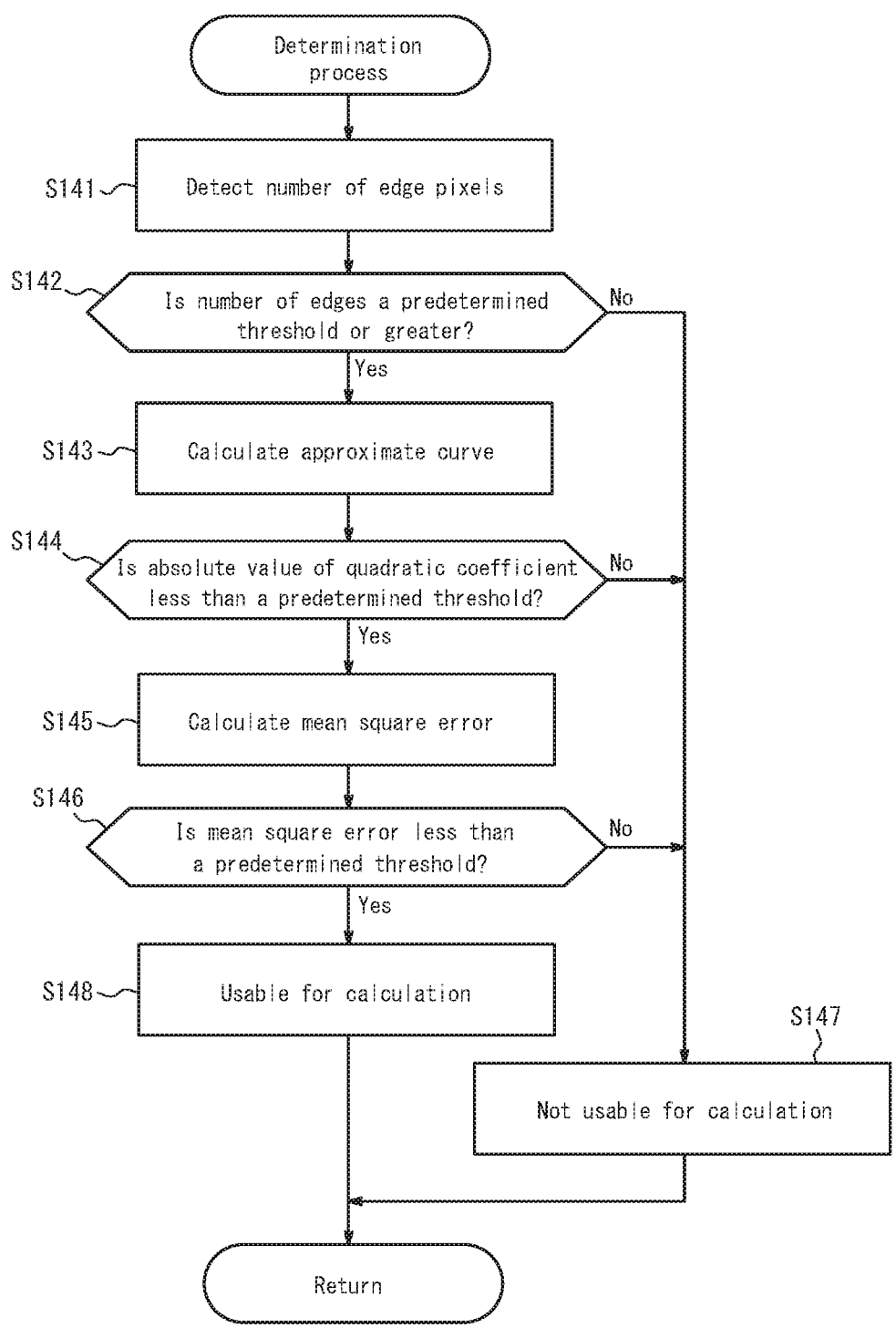
FIG. 8 is a flowchart illustrating a detailed procedure for a determination process performed by a determination unit.

As illustrated in FIG. 7, the input interface 15 acquires images from the first camera 11a and the second camera 11b (step S11).

Once images are acquired by the input interface 15 in step S11, it is determined whether the time for calculating calibration data has been reached (step S12).

When it is determined in step S12 that the time for calculating calibration data has been reached, the edge detector 18 detects edges in the regions of interest of the acquired images (step S13).

Once an edge is detected in step S13, the determination unit 19 performs the determination process on the basis of the detected edge (step S14). The timing for calculating calibration data is set in advance, for example to occur when the user inputs an instruction to calculate the calibration data, when the vehicle 1 performs a predetermined operation, or after a predetermined length of time has elapsed from the previous calculation.

The processes of edge detection and determination may be performed on the images of all of the frames acquired by the input interface 15 during a predetermined time period or may be performed on the images of frames at certain intervals among the images of a plurality of frames acquired by the input interface 15. The processes for edge detection and determination may be performed at predetermined time intervals, or the next process may be started after the previous determination process is complete.

Details of the determination process are described with reference to FIG. 8. As illustrated in FIG. 8, the edge detector 18 detects an edge from the region of interest in an image and detects the number of edge pixels (step S141).

When the number of edge pixels is detected in step S141, the pixel number determination unit 24 of the determination unit 19 determines whether the number of edge pixels is greater than or equal to a predetermined threshold (step S142).

When the number of edge pixels is determined to be greater than or equal to the predetermined threshold in step S142, the curve determination unit 25 calculates an approximate curve on the basis of the position, in the image space, of the detected edge (step S143).

When the approximate curve is calculated in step S143, the curve determination unit 25 determines whether the absolute value of the quadratic coefficient, a, of the quadratic function that represents the approximate curve is less than a predetermined threshold (step S144).

When the absolute value of the quadratic coefficient, a, is determined to be less than a predetermined threshold in step S144, the straight line determination unit 26 calculates an approximate straight line on the basis of the position, within the image space, of the edge detected by the edge detector 18. The straight line determination unit 26 calculates the mean square error for the linear function that represents the calculated approximate straight line (step S145).

When the mean square error is calculated in step S145, the straight line determination unit 26 determines whether the calculated mean square error is less than a predetermined threshold (step S146).

When the number of edge pixels is determined to be less than the predetermined threshold in step S142, the determination unit 19 evaluates the image as being unusable for calculation of calibration data (step S147). When the absolute value of the quadratic coefficient, a, is determined to be greater than or equal to a predetermined threshold in step S144, the determination unit 19 evaluates the image as being unusable for calculation of calibration data (step S147). When the mean square error is determined to be greater than or equal to a predetermined threshold in step S146, the determination unit 19 evaluates the image as being unusable for calculation of calibration data (step S147).

The determination unit 19 evaluates an image subjected to each determination as being usable for calculation of calibration data (step S148) once first through third requirements have been satisfied. The first requirement is that the calculated number of edge pixels be greater than or equal to a predetermined threshold. The second requirement is that the absolute value of the quadratic coefficient, a, be less than a predetermined threshold. The third requirement is that the mean square error be less than a predetermined threshold.

Returning to FIG. 7, when the determination unit 19 in step S15 evaluates an image as being usable for calculation of calibration data, the image characteristic amount calculator 20 calculates an image characteristic amount in each of a plurality of images evaluated as being usable (step S16).

When calculating image characteristic amounts in step S16, the image characteristic amount calculator 20 calculates calibration data from a statistical value of the image characteristic amounts and stores the calibration data in the calibration data memory 17 (step S17).

When images are acquired by the input interface 15 in step S11, but it is determined in step S12 not to be time to calculate the calibration data, the image calibrator 22 calibrates the reference image relative to the benchmark image on the basis of calibration data stored in the calibration data memory 17 (step S18).

Once the position of the reference image is calibrated relative to the benchmark image in step S18, the parallax calculator 23 uses the benchmark image and reference image calibrated by the image calibrator 22 to calculate the parallax between the benchmark image and each region of the reference image (step S19).

In the cases where calculation of parallax is not terminated following calculation of parallax in step S19, the process returns to step S11, and the input interface 15 acquires a new benchmark image and reference image. The image calibration in step S18 and the parallax calculation in step S19 are repeated for the acquired benchmark image and reference image.

When parallax calculation is terminated in step S20, the processing by the image processing apparatus 12 terminates.

The parallax calculation is terminated when a predetermined requirement is satisfied, such as when the user inputs an instruction to terminate, when an instruction to terminate is received from another apparatus, or after a predetermined length of time has elapsed. In FIG. 7, the image calibration in step S18 and the parallax calculation in step S19 are performed after calibration data is stored by steps S13 to S17, but this example is not limiting. For example, the image calibration in step S18 and the parallax calculation in step S19 may be performed in parallel with steps S13 to S17. In this case, the image calibration uses the calibration data stored at that point in time in the calibration data memory 17.

In the above-described embodiments, the image processing apparatus 12 detects edges in images of a plurality of frames and outputs two approximate straight lines from the image of each frame on the basis of the detected edges. Therefore, when lane markings not considered to be straight lines, like the curved lane markings 14c, 14d, are included in the images of a plurality of frames, the image processing apparatus 12 can output only straight lines, excluding the curved lane markings 14c, 14d.

If the images of a plurality of frames acquired by the input interface 15 include images with lane markings 14c, 14d that are curved or are partially absent, such images are therefore excluded from calculation of calibration data. As a result of these images being excluded, the determination unit 19 calibrates images on the basis of images including highly linear lane markings 14c, 14d. The image processing apparatus 12 can therefore determine image characteristic amounts from selected images of a plurality of frames, allowing images to be calibrated at higher accuracy than when calibrating without selecting images.

According to the above-described embodiments, the image processing apparatus 12 outputs an approximate straight line on the basis of an edge when determining that the number of edge pixels is greater than or equal to a predetermined threshold. The image processing apparatus 12 can therefore reduce the probability of an image being calibrated on the basis of a low-accuracy approximate straight line calculated from an edge with a small number of pixels. Therefore, the image processing apparatus 12 can calibrate the image with high accuracy.

According to the above-described embodiments, the image processing apparatus 12 calculates a quadratic function representing an approximate curve on the basis of an edge and outputs an approximate straight line when the absolute value of the quadratic coefficient is less than a predetermined threshold. The image processing apparatus 12 can therefore reduce the probability of an image being calibrated on the basis of an edge with a distribution approximated by a curve. Therefore, the image processing apparatus 12 can calibrate the image with high accuracy.

According to the above-described embodiments, the image processing apparatus 12 outputs an approximate straight line of an edge when it is determined that the least squares error of the approximate straight line of the edge is less than a predetermined threshold. The image processing apparatus 12 can therefore reduce the probability of an image being calibrated on the basis of a straight line constituted by an edge with a low detection accuracy and a scattered distribution. Therefore, the image processing apparatus 12 can calibrate the image with high accuracy.

According to the above-described embodiments, images acquired by the input interface 15 include images capturing two or more lane markings parallel to each other in 3D coordinate space. The image processing apparatus 12 may perform image processing on the basis of an image capturing two or more lane markings parallel to each other in 3D coordinate space. The lane markings include lane markings stipulated by convention, treaty, law, regulation, and the like. For example, the lane markings include those stipulated by the Japanese Road Traffic Act. By using lane markings stipulated by convention, treaty, law, regulation, and the like, the image processing apparatus 12 can more easily acquire images in which lane markings are captured.

According to the image processing apparatus 12 of the above embodiments, the curve determination unit 25 determines whether the absolute value of the quadratic coefficient, a, of an approximate curve is less than a predetermined threshold when the pixel number determination unit 24 determines that the number of edge pixels is greater than or equal to a predetermined threshold. When the absolute value of the quadratic coefficient, a, is determined to be less than a predetermined threshold, the straight line determination unit 26 determines whether the mean square error is less than a predetermined threshold. The determination unit 19 may omit the determination by any one or two of the pixel number determination unit 24, curve determination unit 25, and straight line determination unit 26. In this case, the determination unit 19 evaluates an image that satisfies the conditions in other determinations as being usable for calibration data. This approach can reduce the processing load for determination by the image processing apparatus 12. The determination unit 19 may change the order of the determinations by the pixel number determination unit 24, curve determination unit 25, and straight line determination unit 26.

According to the above embodiments, the calibration data calculator 21 calculates calibration data for calibrating the reference image relative to the benchmark image on the basis of the statistical value of a plurality of image characteristic amounts calculated from benchmark images and reference images of a plurality of frames captured by the stereo camera 11. The calibration data calculator 21 may calculate calibration data on the basis of frames selected from among images of a plurality of frames imaged by a monocular camera 11a. In this case, the calibration data calculator 21 uses image characteristic amounts that are a predetermined benchmark to calculate calibration data on the basis of approximate straight lines of edges obtained from selected frames of images from the monocular camera 11a. For example, the calibration data calculator 21 may determine benchmark coordinates of the vanishing point of an image captured by a monocular camera that images the area in front of the vehicle 1, apply the present disclosure to detect a change in the vanishing point yielded by the camera, and increase the accuracy of calibration so that the coordinates of the vanishing point match the benchmark coordinates.

According to the above embodiments, the image characteristic amount calculator 20 calculates the vanishing point in the benchmark image and the reference image for each frame. The image characteristic amount calculator 20 then calculates the first vanishing point and the second vanishing point from a statistical value (mode) of the vanishing points calculated for each frame, but this configuration is not limiting. For example, instead of accumulating coordinate data of the vanishing points for the benchmark image and reference image of each frame, the image characteristic amount calculator 20 may accumulate the parameters d, e of equation (2) calculated by the straight line determination unit 26 for a plurality of frames. The image characteristic amount calculator 20 may then calculate two lane markings 14c, 14d represented by equation (4) using respective statistical values $d_s$, $e_s$ for the accumulated parameters d, e. The image characteristic amount calculator 20 can then designate the position at which the straight lines of the two lane markings 14c, 14d represented using the statistical values $d_s$, $e_s$ intersect to be the first vanishing point and the second vanishing point.

$$y = d_s x + e_s \qquad (4)$$

According to the above embodiments, the curve determination unit 25 calculates a quadratic function representing an approximate curve of an edge and determines whether the absolute value of the quadratic coefficient is less than a predetermined threshold, but this configuration is not limiting. For example, the curve determination unit 25 may calculate a higher order function than a quadratic function to represent an approximate curve (such as a cubic or quartic function) and determine whether a second degree or higher coefficient is less than a predetermined threshold.

REFERENCE SIGNS LIST

1 Vehicle
10 Stereo camera apparatus
11a Stereo camera
11a First camera
11b Second camera
12 Image processing apparatus
13 Road surface
14a, 14b Lane marking in 3D coordinate space
14c, 14d Lane marking in image space
15 Input interface
16 Controller
17 Calibration data memory
18 Edge detector
19 Determination unit
20 Image characteristic amount calculator
21 Calibration data calculator
22 Image calibrator
23 Parallax calculator
24 Pixel number determination unit
25 Curve determination unit
26 Straight line determination unit
27 Output interface

The invention claimed is:

1. An image processing apparatus comprising:
an input interface configured to acquire video including a plurality of frames from a camera; and
a controller configured to detect an edge corresponding to at least one of two or more parallel, straight lines in a subject of the camera from each of the plurality of frames acquired by the input interface, to select a frame for use by evaluating the detected edge, and to calculate calibration data for the video acquired from the camera on the basis of a straight line corresponding to the edge obtained from a plurality of selected frames, wherein
the controller calculates a quadratic or higher order function representing an approximate curve corresponding to the edge, determines whether an absolute value of at least a quadratic coefficient of the quadratic or higher order function is less than a predetermined threshold, and selects the frame for use when determining that the absolute value of the quadratic coefficient is less than a predetermined threshold.

2. The image processing apparatus of claim 1, wherein the controller detects an edge detected in a region of interest of a frame as the edge corresponding to at least one of two or more parallel, straight lines in the subject.

3. The image processing apparatus of claim 1, wherein the controller determines whether a number of pixels of the detected edge is greater than or equal to a predetermined threshold and selects the frame for use when determining that the number of pixels of the detected edge is greater than or equal to a predetermined threshold.

4. The image processing apparatus of claim 1, wherein the controller calculates a least squares error of a straight line corresponding to the edge, determines whether the least squares error is less than a predetermined threshold, and selects the frame for use when determining that the least squares error is less than a predetermined threshold.

5. The image processing apparatus of claim 1, wherein the video comprises images capturing two or more parallel lane markings on a road surface in three-dimensional (3D) coordinate space, and the edge corresponds to an edge of the lane markings.

6. The image processing apparatus of claim 1, wherein the controller calculates calibration data for the camera by detecting edges corresponding to at least two lines, calculating an image characteristic amount on the basis of straight lines corresponding to at least two of the edges obtained from the plurality of selected frames, and performing statistical processing on image characteristic amounts of the plurality of frames.

7. The image processing apparatus of claim 6, wherein the image characteristic amount is a coordinate of a vanishing point obtained from lines of two of the edges.

8. The image processing apparatus of claim 7, wherein as the statistical processing, the controller generates a histogram of the image characteristic amounts of the plurality of frames and calculates a mode of the image characteristic amounts.

9. The image processing apparatus of claim 6, wherein as the statistical processing, the controller generates a histogram of the image characteristic amounts of the plurality of frames and calculates a mode of the image characteristic amounts.

10. The image processing apparatus of claim 1, wherein
the input interface acquires a benchmark image and a reference image captured by a stereo camera, and
the controller calculates calibration data for calibrating the reference image relative to the benchmark image on the basis of a straight line corresponding to an edge obtained from each of the benchmark image and the reference image.

11. A stereo camera apparatus comprising:
a stereo camera; and
an image processing apparatus comprising an input interface configured to acquire video including a plurality of frames from the stereo camera; and a controller configured to detect an edge corresponding to at least one of two or more parallel, straight lines in a subject of the stereo camera from each of the plurality of frames acquired by the input interface, to select a frame for use by evaluating the detected edge, and to calculate calibration data for the video acquired from the stereo camera on the basis of a straight line corresponding to the edge obtained from a plurality of selected frames, wherein
the controller calculates a quadratic or higher order function representing an approximate curve corresponding to the edge, determines whether an absolute value of at least a quadratic coefficient of the quadratic or higher order function is less than a predetermined threshold, and selects the frame for use when determining that the absolute value of the quadratic coefficient is less than a predetermined threshold.

12. A vehicle provided with a stereo camera apparatus, the stereo camera apparatus comprising:
a stereo camera; and
an image processing apparatus comprising an input interface configured to acquire video including a plurality of frames from the stereo camera; and a controller configured to detect an edge corresponding to at least one of two or more parallel, straight lines in a subject of the stereo camera from each of the plurality of frames acquired by the input interface, to select a frame for use by evaluating the detected edge, and to calculate calibration data for the video acquired from the stereo camera on the basis of a straight line corresponding to the edge obtained from a plurality of selected frames, wherein
the controller calculates a quadratic or higher order function representing an approximate curve corresponding to the edge, determines whether an absolute value of at least a quadratic coefficient of the quadratic or higher order function is less than a predetermined threshold, and selects the frame for use when determining that the absolute value of the quadratic coefficient is less than a predetermined threshold.

13. An image processing method comprising:
acquiring, with an input interface, video including a plurality of frames from a camera;
detecting, with a controller, an edge corresponding to at least one of two or more parallel, straight lines in a subject of the camera from each image of the plurality of frames acquired by the input interface;
selecting, with the controller, a frame for use by evaluating the detected edge; and
calculating, with the controller, calibration data for the video acquired from the camera on the basis of a straight line corresponding to the edge obtained from a plurality of selected frames, wherein
the controller calculates a quadratic or higher order function representing an approximate curve corresponding to the edge, determines whether an absolute value of at least a quadratic coefficient of the quadratic or higher order function is less than a predetermined threshold, and selects the frame for use when determining that the absolute value of the quadratic coefficient is less than a predetermined threshold.

* * * * *